(12) United States Patent
Chang et al.

(10) Patent No.: US 11,935,113 B2
(45) Date of Patent: *Mar. 19, 2024

(54) INTELLIGENT DELIVERY AND ACQUISITION OF DIGITAL ASSETS

(71) Applicant: Apple Inc., Cupertino, CA (US)

(72) Inventors: Christopher B. Chang, Los Altos, CA (US); Sean B. Kelly, San Francisco, CA (US); Olagappan Manickam, Cupertino, CA (US); Thomas Alsina, Mountain View, CA (US); Payam Mirrashidi, San Francisco, CA (US); Michael Kuohao Chu, Cupertino, CA (US); Kevin R. Lafferty, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,913

(22) Filed: Jan. 13, 2023

(65) Prior Publication Data

US 2023/0186373 A1 Jun. 15, 2023

Related U.S. Application Data

(63) Continuation of application No. 17/361,082, filed on Jun. 28, 2021, now Pat. No. 11,556,979, which is a
(Continued)

(51) Int. Cl.
*G06Q 30/00* (2023.01)
*G06F 16/40* (2019.01)
(Continued)

(52) U.S. Cl.
CPC ......... *G06Q 30/0641* (2013.01); *G06F 16/40* (2019.01); *G06Q 30/0601* (2013.01); *H04L 67/06* (2013.01)

(58) Field of Classification Search
CPC ................. G06Q 30/0641; G06Q 30/0601
See application file for complete search history.

(56) References Cited

U.S. PATENT DOCUMENTS 6,507,727 B1  1/2003  Henrick
7,305,357 B2 12/2007 Hamilton
(Continued)

FOREIGN PATENT DOCUMENTS

CN    1732454    2/2006
CN  101312595   11/2008
(Continued)

OTHER PUBLICATIONS

Dhawan, A. K., Peev, I. B., & Koch, Z. (0904). Personal shared playback Retrieved from https://search.proquest.com/docview/33883010?accountid=14753.*

(Continued)

*Primary Examiner* — Kathleen Palavecino
(74) *Attorney, Agent, or Firm* — FLETCHER YODER PC

(57) ABSTRACT

Improved techniques and systems for delivery and acquisition of digital assets are disclosed. The techniques and systems are especially suitable and useful for delivering digital assets (e.g., media assets) that are available for acquisition and electronic delivery from online stores to electronic devices. In accordance with one aspect, when a digital asset is acquired from an online store via an electronic device associated with a user, the digital asset can be arranged for delivery to a number of other of electronic devices also associated with the user. It will be appreciated that the digital asset can be delivered and acquired without requiring explicit user input or instruction in accordance with another aspect. Other aspects of the techniques and systems include customization of configuration and user (Continued)

interfaces that are provided to facilitate acquisition of digital assets in a more efficient manner.

20 Claims, 9 Drawing Sheets

Related U.S. Application Data continuation of application No. 16/253,096, filed on Jan. 21, 2019, now Pat. No. 11,049,173, which is a continuation of application No. 15/815,677, filed on Nov. 16, 2017, now Pat. No. 10,185,988, which is a continuation of application No. 13/171,253, filed on Jun. 28, 2011, now Pat. No. 9,830,642.

(60) Provisional application No. 61/451,057, filed on Mar. 9, 2011.

(51) Int. Cl.
    G06Q 30/0601    (2023.01)
    H04L 67/06      (2022.01)

(56) References Cited

U.S. PATENT DOCUMENTS

| | | | |
|---|---|---|---|
| 7,533,061 B1 | 5/2009 | Cheng et al. | |
| 7,594,258 B2 | 9/2009 | Mao et al. | |
| 7,617,162 B2 | 11/2009 | Saini | |
| 7,644,139 B2 | 1/2010 | Shenfield | |
| 10,185,988 B2 | 1/2019 | Chang et al. | |
| 2001/0046366 A1 | 11/2001 | Susskind | |
| 2002/0062252 A1 | 5/2002 | Van Zoest et al. | |
| 2002/0082922 A1 | 6/2002 | Van Zoest et al. | |
| 2002/0184635 A1 | 12/2002 | Istvan | |
| 2003/0079133 A1 | 4/2003 | Breiter et al. | |
| 2003/0139980 A1 | 7/2003 | Hamilton | |
| 2004/0203638 A1 | 10/2004 | Chan et al. | |
| 2004/0237104 A1 | 11/2004 | Cooper et al. | |
| 2005/0027700 A1 | 2/2005 | Turner et al. | |
| 2005/0050576 A1 | 3/2005 | Upendran et al. | |
| 2005/0055716 A1 | 3/2005 | Louie et al. | |
| 2006/0031551 A1 | 2/2006 | Agresta et al. | |
| 2006/0036554 A1 | 2/2006 | Schrock et al. | |
| 2006/0074750 A1 | 4/2006 | Clark et al. | |
| 2006/0025163 A1 | 6/2006 | Smith et al. | |
| 2006/0161635 A1 | 7/2006 | Lamkin et al. | |
| 2006/0173974 A1* | 8/2006 | Tang | H04L 63/08 |
| | | | 709/225 |
| 2006/0212906 A1 | 9/2006 | Cantalini | |
| 2007/0150550 A1 | 6/2007 | Lin et al. | |
| 2007/0174888 A1* | 7/2007 | Rubinstein | H04N 21/47202 |
| | | | 725/115 |
| 2008/0155613 A1 | 6/2008 | Benya et al. | |
| 2008/0244033 A1 | 10/2008 | Hook et al. | |
| 2008/0320560 A1* | 12/2008 | Casey | H04L 63/10 |
| | | | 726/3 |
| 2009/0043692 A1 | 2/2009 | Pippuri et al. | |
| 2009/0052380 A1 | 2/2009 | Espelien | |
| 2009/0063301 A1 | 3/2009 | Ward et al. | |
| 2009/0198588 A1 | 8/2009 | White et al. | |
| 2009/0282057 A1 | 11/2009 | Thomas | |
| 2010/0057884 A1 | 3/2010 | Brownell et al. | |
| 2010/0185306 A1 | 7/2010 | Rhoads | |
| 2011/0004522 A1 | 1/2011 | Lee | |
| 2011/0040658 A1 | 2/2011 | Gautier et al. | |
| 2012/0066286 A1 | 3/2012 | Heredia et al. | |
| 2012/0079591 A1 | 3/2012 | Hassan-Le Neel et al. | |

FOREIGN PATENT DOCUMENTS

| | | |
|---|---|---|
| GB | 2419206 | 4/2006 |
| GB | 2469384 | 10/2010 |
| JP | 2005011218 | 1/2005 |
| KR | 10-2010-0098050 | 9/2010 |
| KR | 10-2011-0011040 | 2/2011 |
| WO | 0232026 | 4/2002 |
| WO | 2004061608 A | 7/2004 |
| WO | 2009032805 | 3/2009 |

OTHER PUBLICATIONS

Dhawan, A.K., Oeev, I.B., & Koch, Z. (0904). Personal shared playback.*

Extended European Search Report for European Application No. 22208953.4 dated Jun. 28, 2023; 9 pgs.

Korean Notice of Preliminary Rejection (English and Korean) of KR 10-2013-7023452; dated Jun. 23, 2015 (8 pgs.).

"QoS control in triple play" Network World, vol. 12, No. 10, Japan, IDG, Japan Inc., Oct. 1, 2007. English summary of article from Ohtsuka Patent Office included.

Dhawan, A.K., Peev, I.B., & Koch, Z. (0904). Personal shared playback Retrieved from https://search.proquest.com/dovciew/333883010?accountid=14753.

Indian Office Action for Indian Patent Application No. 7019/CHENP/2013 dated Aug. 5, 2019; (7 pgs.).

* cited by examiner

INTELLIGENT DELIVERY AND ACQUISITION OF DIGITAL ASSETS

CROSS-REFERENCE TO RELATED APPLICATION

This application is a continuation of U.S. application Ser. No. 17/361,082, filed Jun. 28, 2021, which is a continuation of U.S. application Ser. No. 16/253,096, filed Jan. 21, 2019, which is a continuation of U.S. application Ser. No. 15/815,677, filed Nov. 16, 2017, which is a continuation of U.S. application Ser. No. 13/171,253, filed Jun. 28, 2011, which claims priority to U.S. Provisional Patent Application No. 61/451,057, filed Mar. 9, 2011, entitled "INTELLIGENT DELIVERY AND ACQUISITION OF DIGITAL ASSETS," which are herein incorporated by reference in their entireties for all purposes.

BACKGROUND OF THE INVENTION

Online stores and online shopping have become increasing more popular in recent years. Desktop and laptop computers have been used to purchase various goods and services from online stores. An online store may allow customers, via a network connection to the Internet, to browse, search and purchase various different items from the online store. Purchased items can be delivered by mail or make available for pickup at a store or another location.

Recently, digital assets (e.g., musical songs, movies, computer application programs) have become available for purchase from online stores. Moreover, digital assets have become available for delivery directly to the device used to purchase them. As such, today, a digital asset can be purchased from an online store by way of an electronic device (e.g., a desktop computer) from a residence and immediately delivered to the electronic device used to acquire the digital asset. In other words, after purchasing a digital asset from an online store via an electronic device, the digital asset can be "downloaded" by the electronic device for subsequent use thereon.

However, more recently, the number and variety of electronic devices with the ability to access online stores have dramatically increased. Today, a person may own and/or operate several electronic devices with the ability to access online stores, including a desktop computer, a laptop computer, a pad or tablet computer (e.g., iPad™), a smartphone, a media player, a gaming device, a television, and so on. In addition, an ever increasing number and types of digital assets are becoming available at online stores for various electronic devices, including, media, books, application programs, etc. As a result, management of delivery of digital assets to electronic devices can pose difficulties for users, especially those maintaining collections of various digital assets on several distinct electronic devices. Hence, there is a need for improved acquisition and delivery of digital assets.

SUMMARY

Improved techniques and systems for delivery and acquisition of digital assets are disclosed; The techniques and systems are especially suitable and useful for delivering digital assets (e.g., media assets) that are available for acquisition and electronic delivery from online stores to electronic devices.

In accordance with one aspect, when a digital asset is acquired form an online store via an electronic device associated with a user, the digital asset can be arranged for delivery to a number of other of electronic devices also associated with the user. It will be appreciated that the digital asset can be delivered and acquired without requiring explicit user input or instruction in accordance with another aspect. By way of example, an electronic device can be configured to automatically download a digital asset when it receives a notification (e.g., a push notification) directly or indirectly via an online store server. The online store server can be configured to send the notification to the electronic device when another electronic device acquires the digital asset from the online store. Other aspects of the techniques include customization of configuration and user interfaces that are provided to facilitate acquisition of digital assets in a more efficient manner.

The techniques and mechanisms can be implemented in numerous ways, including as a method, system, device, or apparatus (including computer readable medium or graphical user interface). Several embodiments are discussed below.

One embodiment pertains to a method for facilitating delivery of a digital asset, via a network, from an online store to one or more electronic devices associated with a user. The method can, for example, be used by an online store server to facilitate delivery of a digital asset to one or more electronic devices. In doing so, the method can determine whether a digital asset acquired from the online store, by or via an acquisition device associated with a user, is to be delivered to one or more electronic devices, other than the acquisition device, that are also associated with the user. The digital asset acquired from the online store can be arranged for delivery to the one or more electronic devices associated with the user when the determining determines that the digital asset is to be delivered to the one or more electronic devices.

Another embodiment pertains to a method that can be used by an electronic device to acquire a digital asset from an online store via a network. The method can, for example, operate to obtain an indication of a digital asset available for acquisition by the electronic device associated with a user. The indication can be a result of the digital asset being acquired from the online store by an acquisition device other than the electronic device, where the acquisition device is also associated with the user. The method can also determine whether the user of the electronic device is authenticated to the online store. Subsequently, the method can determine whether to deliver the digital asset to the electronic device if the user of the electronic device is authenticated to the online store. The method can then arrange for electronic delivery of the digital asset to the electronic device when the determining determines that the digital asset is to be delivered to the electronic device. The arranging for electronic delivery can include downloading the digital asset over the network to the electronic device.

Yet another embodiment pertains to a method for automatically delivering a digital asset, via a network, from an online store to one or more electronic devices associated with a user. The method can, for example, be used by an online store server. In doing so, initially, it can be determined whether a digital asset has been purchased or is to be purchased from an online store by or via an acquisition device associated with a user. Then, at least partially based automatic download data associated with the user, the method can determine whether to the digital asset is to be delivered via the network to one or more other electronic devices associated with the user. The method can also arrange for delivery of the digital asset to the one or more electronic devices associated with the user without requiring any user explicit request f such from the one or more electronic devices when it is determined that the digital asset is to be delivered to the one or more electronic devices.

Still another embodiment pertains to an electronic device that includes a display, and one or more processors or processing cores operable to display an automatic download configuration window on the display. It should be noted that the automatic download configuration window can include user-selectable automatic download options for automatically downloading one or more digital assets to the electronic device when a digital asset is acquired from an online repository via another electronic device.

Still another embodiment pertains to a non-transitory computer readable medium that includes at least tangible computer program code stored thereon for facilitating delivery of a digital asset, via a network, from an online store to one or more electronic devices associated with a user. The computer readable medium can, for example, include at least (i) computer program code for determining whether a digital asset, acquired or to be acquired from the online store by or via an acquisition device associated with a user, is to be delivered to one or more electronic devices other than the acquisition device that are also associated with the user; and (ii) computer program code for arranging delivery of the digital asset to the one or more electronic devices associated with the user when the computer program code for determining determines that the digital asset is to be delivered to the one or more electronic devices.

Yet still another embodiment pertains to a non-transitory computer readable medium that includes at least executable computer program code tangibly stored thereon for delivering at least one digital asset from an online digital asset store to an electronic device via a network. The computer readable medium can, for example, include: computer program code for acquiring usage rights to a digital asset from the online digital asset store using an acquisition device, the acquisition device being affiliated with a user account; computer program code for determining one or more other electronic devices that are associated with the user account; computer program code for obtaining automatic download configuration data for each of the one or more other electronic devices; computer program code for determining whether the digital asset is be delivered to at least one of the one or more other electronic devices based on the automatic download configuration data corresponding to the respective one or more other electronic devices; and computer program code for arranging for automatic delivery of the digital asset to the at least one of the one or more other electronic devices when it is determined that the digital asset is be delivered to at least one of the one or more other electronic devices.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

Improved techniques and systems for delivery and acquisition of digital assets are disclosed. The techniques and systems are especially suitable and useful for delivering digital assets (e.g., media assets) that are available for acquisition and electronic delivery from online stores to electronic devices.

In accordance with one aspect, when a digital asset is acquired form an online store via an electronic device associated with a user, the digital asset can be arranged for delivery to a number of other of electronic devices also associated with the user. It will be appreciated that the digital asset can be delivered and acquired without requiring explicit user input or instruction in accordance with another aspect. By way of example, an electronic device can be configured to automatically download a digital asset when it receives a notification (e.g., a push notification) directly or indirectly via an online store server. The online store server can be configured to send the notification to the electronic device when another electronic device acquires the digital asset from the online store. Other aspects of the techniques include customization of configuration and user interfaces that are provided to facilitate acquisition of digital assets in a more efficient manner.

Embodiments are discussed below in greater detail with reference to FIGS. 1-9. However, those skilled in the art will readily appreciate that the detailed description given herein with respect to these figures is for explanatory purposes as the invention extends beyond these limited embodiments.

Figure 1:
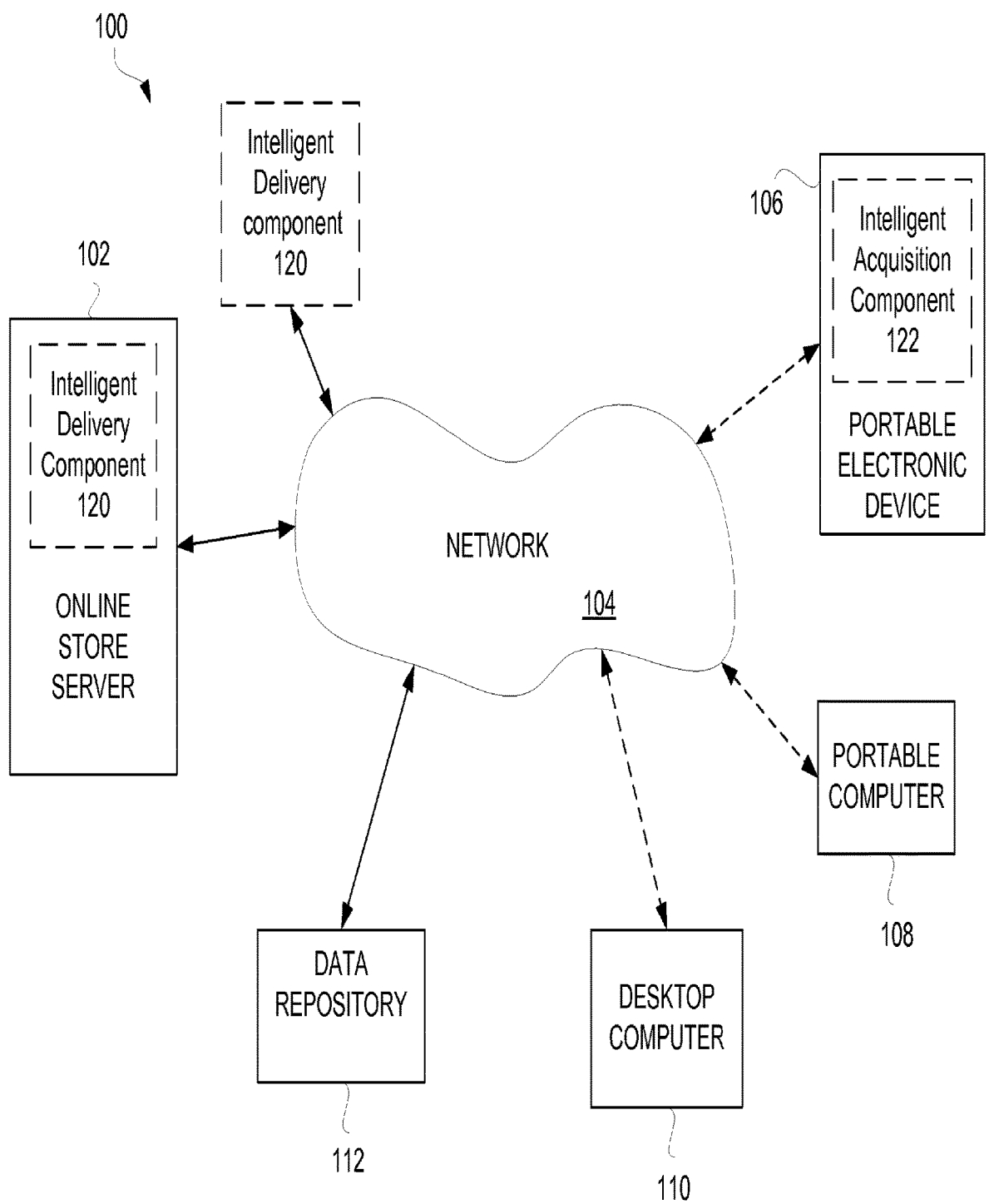
FIG. 1 is depicts a block diagram of the digital asset acquisition and delivery system in accordance with one embodiment.

FIG. 1 is depicts a block diagram of the digital asset acquisition and delivery system 100 in accordance with one embodiment. Referring to FIG. 1, the digital asset acquisition and delivery system 100 includes an online store server 102 (e.g., a digital asset store server 102) providing digital assets to various electronic devices 106, 108 and 110 for online acquisition. Digital assets can, for example, include various types of media related items (e.g., musical albums, songs, movies, audio, video, textual content, books) as well as various application programs ("applications") that can be provided for electronic devices (e.g., productivity products, games, computer applications for computing devices). It should be noted that the online store server 102 can effectively host an online store (e.g., a digital asset store that can offer digital assets). Generally, the online store server 102 can facilitate searching, browsing and purchasing of digital assets. Referring back to FIG. 1, the online store server 102 can be effectively coupled by wire and/or wirelessly to a network 104. The network 104 can, for example, be a data network, a local area network, a wide area network, a global network, public network, a private network, or the Internet. It should be noted that the network 104 can be representative of a number of different networks separately owned and operated.

In any case, the online store server 102 can effectively serve as, or provide, a delivery system for delivering digital assets via the network 104 to other devices including, a portable electronic device 106, a portable computer 108, and a desktop computer 110. These electronic devices can acquire digital assets via the online store server 102. It should be noted that that the each one of the electronic devices 106, 108 and 100 can also be connected by wire and/or wirelessly to the network 104. As such, these devices can effectively acquire various digital assets from the online store server 102 via the network 104. By way of example, a user (e.g., a person, an entity, an application program, a group) can effectively use the portable computer 108 to connect via the network 104 to the online store server 102 to acquire a digital asset by purchasing the digital asset. Following the purchase, the online store server 102 can facilitate download of the digital asset to the portable computer 108. The digital asset can be stored in the online store server 102 or a data repository (e.g., a data repository server) 112. As such, downloading of the digital asset can be facilitated by another server (e.g., a data repository server 112) via the network 104 or another network (not shown). In any case, the digital asset acquisition and delivery system 100 can facilitate acquisition and delivery of digital assets via one or more networks (e.g., network 104) to one or more various devices (e.g., portable electronic device 106, portable computer 108 and/or desktop computer 110).

Moreover, the digital asset acquisition and delivery system 100 can facilitate acquisition and delivery of digital assets in an intelligent manner among various electronic devices, whereby a digital asset acquired by one electronic device (e.g., portable computer 108) can be effectively delivered to another electronic device (e.g., electronic device 106). Specifically, in accordance with the embodiment depicted in FIG. 1, an intelligent delivery component 120 can be provided as a separate component, as a part of the online store server 102, and/or as a part of another entity (e.g., a repository server 112) (not shown). As such, the intelligent delivery component 120 can, for example, be provided as a server or server component as will be appreciated by those skilled in the art. The intelligent delivery component 120 can be operable to determine whether a digital asset that has been acquired or is soon to be acquired from the online store server 102 by or via an acquisition device (e.g., portable computer 108) is to be delivered to one or more electronic devices other than the acquisition device (e.g., electronic devices 106 and 110). As used herein, a digital asset acquired (e.g., purchased, rented, ordered, requested) can refer to a digital asset that has been acquired or that is soon to be acquired.

Typically, the acquisition device and the other one or more other electronic devices are associated with the same user (e.g., a number of electronic devices owned, operated, and/or registered to a person). In any case, if the intelligent delivery component 120 determines that the digital asset is to be delivered to the one or more electronic devices other than the acquisition device, the intelligent delivery component 120 can arrange delivery of the digital asset to the acquisition device asset for delivery to one or more electronic devices other than the acquisition device. It should be noted that instead of, or in addition to, the digital asset delivered (or to be delivered) to the acquisition device, the intelligent delivery component 120 can arrange the same digital asset or another digital asset for delivery to one or more electronic devices other than the acquisition device. In other words, the digital asset arranged for delivery need not be identical or limited to the digital asset acquired by the acquisition device. The another digital asset that can be arranged for delivery can also be available for acquisition from the online store can be a similar digital asset, a different format of the digital asset, or a different version of the digital asset). As a result, the digital asset or the another digital asset can be acquired from the online store server 102 and can be delivered to one or more electronic devices other than the acquisition device. It will be appreciated that the intelligent acquisition device component 122, among other things, can facilitate automatic download of digital assets available from an online store to one or more electronic devices. By way of example, when a digital asset (e.g., a song) has been acquired from the online store server 102 via the portable computer 108 associated with a user, the intelligent delivery component 120 can arrange for automatic download of the same digital asset or one or more other electronic device, such as the portable electronic device 106, which is also associated with the same user.

It should be noted that an intelligent acquisition component can be provided for an electronic device to facilitate acquisition of a digital asset arranged for delivery by the intelligent delivery component 120. Referring to FIG. 1, an intelligent acquisition device component 122 can be provided for the portable electronic device 106. As will be described below in greater detail, the intelligent acquisition component 122, among other things, can facilitate automatic download of various digital assets to the portable electronic device 106 based on the information (or data) provided by the intelligent acquisition component 122. The intelligent acquisition device component 122 may also be configured to perform additional tasks including, for example, determining whether to download one or more digital assets that have been made available to the portable electronic device 106.

Those skilled in the art will readily know that the intelligent delivery component 120 and intelligent acquisition component 122 can, for example, be provided as software and/or hardware components including and/or supported by memory, and one or processers or processing cores (e.g., a Central Processing Unit (CPU)).

Figure 2:
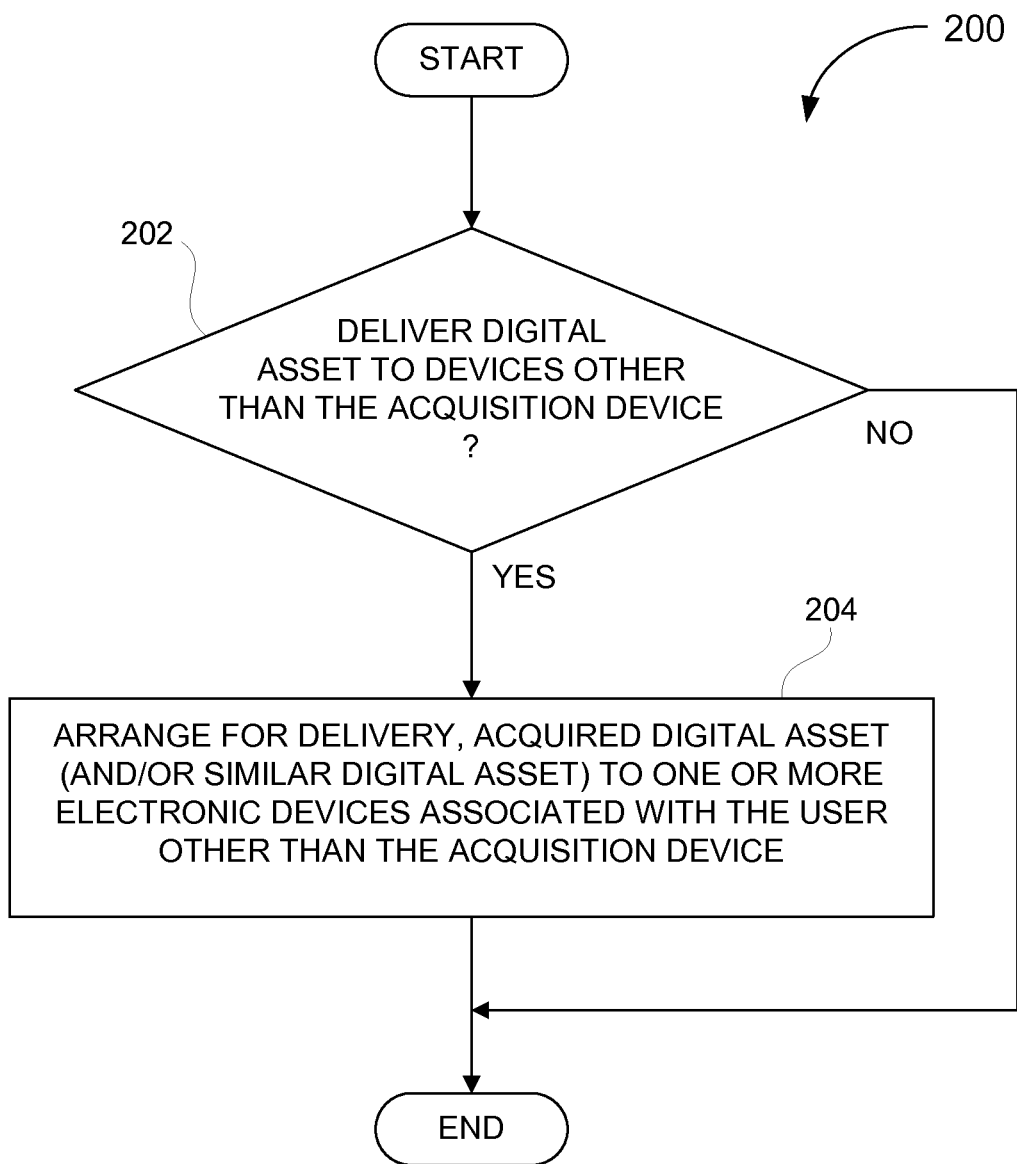
FIG. 2 depicts a method for facilitating delivery of a digital asset available for acquisition from an online store in accordance with one embodiment.

FIG. 2 depicts a method 200 for facilitating delivery of a digital asset available for acquisition from an online store in accordance with one embodiment. Method 200 can, for example, be used by the intelligent delivery component 120 depicted in FIG. 1. As such, method 200 can, for example, be used by an online store server (e.g., online store server 102). Referring to FIG. 2, it is determined (202) whether a digital asset, acquired or to be acquired from the online store by or via an acquisition device associated with a user, is to be delivered to one or more electronic devices (other than the acquisition device) that are associated with the user. If it is determined (202) that the digital asset is to be delivered to one or more electronic devices other than the acquisition device, the digital asset and/or another digital asset available for acquisition from the online store can be arranged for delivery to the one or more other electronic devices (other than the acquisition device) that are associated with the user.

Method 200 can end after the digital asset has been arranged for delivery to the one or more electronic devices other than the acquisition device.

Figure 3:
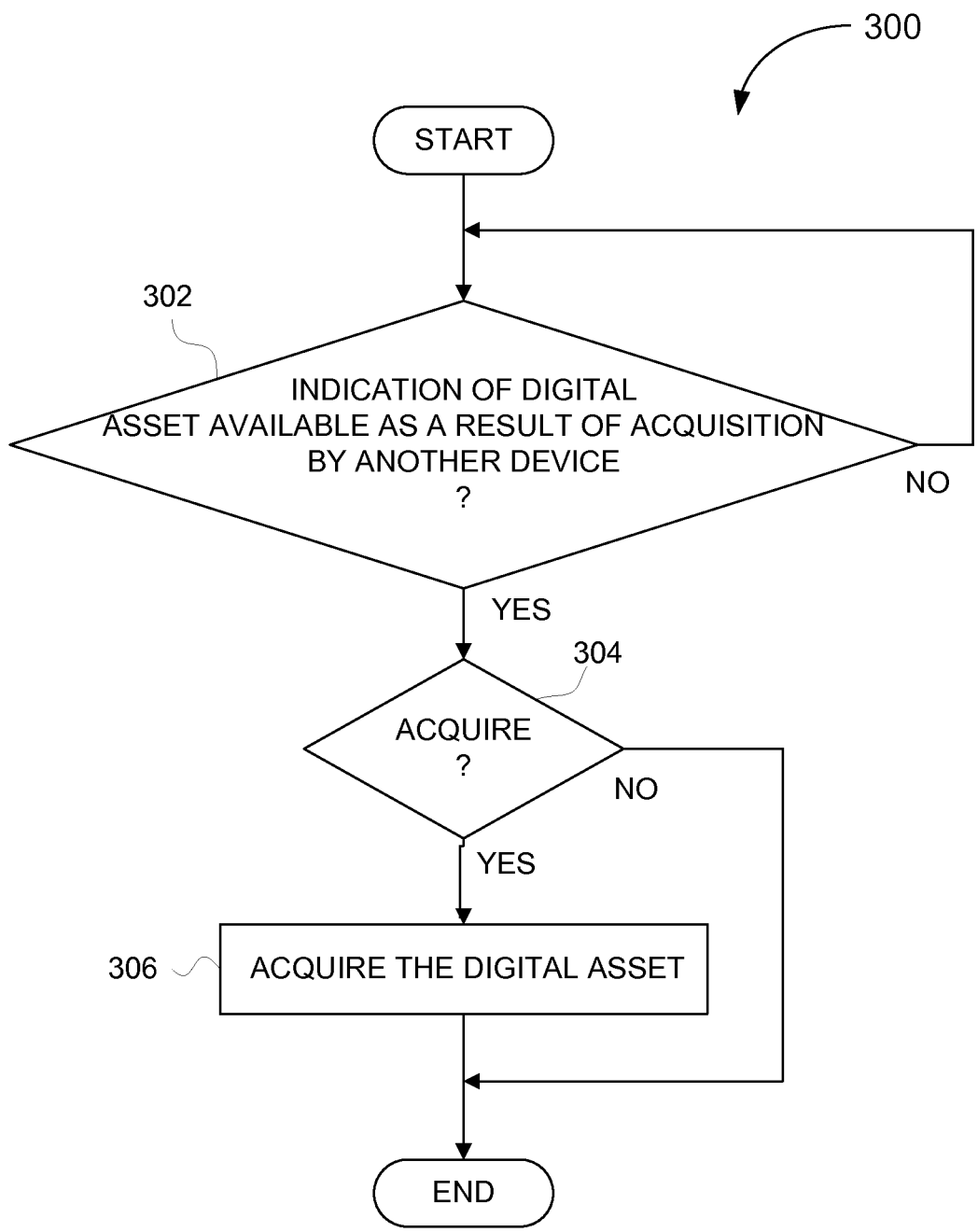
FIG. 3 depicts a method for acquiring a digital asset available for acquisition from an online store in accordance with one embodiment.

FIG. 3 depicts a method 300 for acquiring a digital asset available for acquisition from an online store in accordance with one embodiment. Method 300 can, for example, be used by the intelligent acquisition component 122 depicted in FIG. 1. As such, method 300 can be used by an electronic device to acquire digital assets available for acquisition from an online store. Referring to FIG. 3, initially, it is determined (302) whether an indication of a digital asset being available (or arranged) for acquisition has been obtained. Typically, the digital asset is available by a device associated with a user.

It should be noted that the indication can be obtained as a result of the digital asset (or a similar digital asset) being acquired or about to be acquired from the online store via another device associated with the same user. In other words, the indication can be provided to the electronic device when a digital asset has been acquired or is to be acquired from the online store by a device other than the electronic device. If it is determined (302) that the indication has been received, it can be determined (304) whether to acquire the digital asset made available as a result of acquisition by another electronic device. If it is determined (304) that the digital asset is not to be acquired the digital asset, method 300 can end. However, the digital asset can be acquired (306) if it is determined (304) to acquire the digital asset before method 300 ends.

Figure 4:
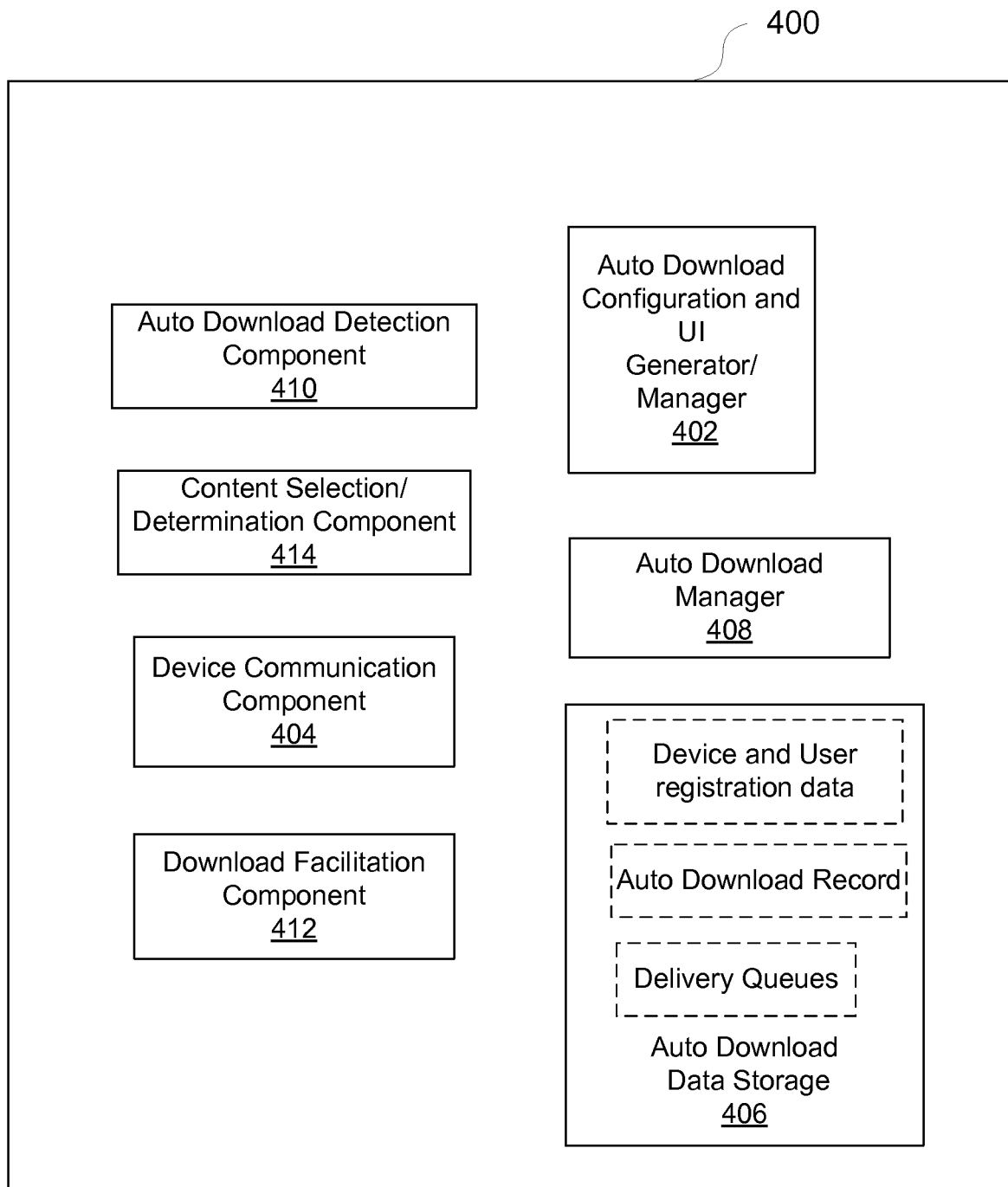
FIG. 4 depicts an automatic download delivery component in accordance with one embodiment.

As noted above, an intelligent delivery component and an intelligent acquisition component, among other things, can facilitate automatic download of digital assets available from an online store to one or more devices. To further elaborate, FIG. 4 depicts an automatic download delivery component 400 in accordance with one embodiment. One or more components of the automatic download delivery system 400 can, for example, be provided by the intelligent delivery component 120 depicted in FIG. 1 to facilitate automatic download of digital assets available from an online store. As such, the automatic download delivery component 400 can, for example, be provided by or for a server device (e.g., an online store server).

Referring to FIG. 4, automatic download delivery component 400 can provide an automatic download configuration and UI generator and/or manager (configuration manager) 402 operable to facilitate configuring one or more automatic download parameters, as well as being operable to facilitate generation of one or more User Interface (UI) components (e.g., dialog windows, configuration windows). In particular, configuration manager 402 can determine and send an electronic device various UI components for an automatic download option. It will be appreciated that the configuration manager 402 can customize or determine a UI component for an electronic device as deemed appropriate for that particular electronic device. By way of example, if an electronic device does not have the capability to execute applications or use digital books (e.g., does not have a book reading/presenting application for presenting digital books) the configuration manager 402 may provide a UI component that does not list applications or digital books as an option but lists other types of digital assets (e.g., music, movies) as an option that can be selected for automatic download to the device. Selected digital assets can be automatically downloaded to an electronic device based on the selected automatic download options when such assets are acquired (e.g., purchased) from an online store by another device also associated with the user. The user can have previously provided automatic download options.

A UI component generated for an electronic device can be sent to the electronic device by a device communication component 404 or by other mechanisms. In any case, the user of the electronic device that receives a UI component can effectively provide a number of automatic download options by interacting with the UI component and allowing the options to be sent back to the configuration manager 402 for processing. Data including the options provided by the user can be stored in an automatic download data storage 406, for example, as a part of automatic download data arranged for various devices and/or users associated with such devices. The automatic download data storage 206 can be used to store other information, including device and user registration data indicative of a number of devices registered by each one of users of an online store (e.g., devices registered by a person to an account).

It should be noted that an auto download manager 408 can effectively manage download processing as well as coordinate operations of various other components depicted in FIG. 4. As such, the auto download manager 408 can, for example, interact with the configuration manager 402 to request generation of an automatic download configuration UI, store and obtain data from the automatic download data storage 206, and so on. Generally, download activities can be initiated based on detection of an event or an activity by the auto download detection component 410. By way of example, the auto download detection component 410 can detect that a digital asset has been purchased or is to be purchased via an electronic device associated with a user. In the example, if this is the first purchase made by the user and/or first purchase made via the electronic device, the configuration manager 402 can be activated to generate an initial UI component to be displayed to the electronic device used to purchase the asset and/or a number of other electronic devices that are associated with the user. The initial UI component can, for example, be a dialog window to inform the user of the availability of an auto download option and allow the user to request more information and/or request to be provided with configuration user interfaces on a single device and/or separately on each one the devices associated with the user. In accordance with one exemplary embodiment, an automatic download configuration UI can be "pushed" to an electronic device and can consequently be displayed at a time determined or deemed appropriate by the automatic download delivery component 400.

Typically, after automatic download options have been provided by the user, one or more digital assets can be arranged for automatic delivery to one or more electronic devices other than the one used to acquire the digital asset. By way of example, when purchase of a digital asset from an online store via an acquisition device is detected by the automatic download detection component 410, the auto download manager 408 can determine at least partly based on device, user registration data, and auto download configuration data stored in the auto download data storage 406, whether the digital asset and/or another digital asset (e.g., a similar digital asset, an additional bonus asset) is to be automatically downloaded to one or more electronic devices other than the acquisition device registered to the user. If so, a content selection/determination component 414 can determine and/or select the content to be automatically downloaded based on one more criteria (e.g., a device capability, a network parameter). As a result, a digital asset (e.g., a song) purchased by a user from an online store by using one registered device may, for example, be arranged for automatic download to another device also registered to the same user. The automatic download may, for example, occur when the user has effectively allowed or enabled the second device to receive automatic download of songs purchased by one or more other devices registered to the user.

As noted above, download activities can be initiated based on detection of an event or activity by the auto download detection component 410. It should be noted that the download detection component 410 can, for example, receive an indication of an event from an online store and/or another entity. Furthermore, automatic download of a digital asset can be facilitated by a download facilitation component 412 which can, for example, place the digital asset in a queue for delivery. The queue can be stored in the auto download storage 406.

Those skilled in the art will also appreciate that an automatic download token may also be used to facilitate downloading of digital assets in a secure manner. As such, an automatic download token can, for example, be generated by the download facilitation component 412 and effectively provided to an electronic device. The automatic download token can be sent back by the electronic device and recognized as a valid token by the download facilitation component 412. An automatic download token may be valid for a limited time or limited number of automatic downloads.

Figure 5:
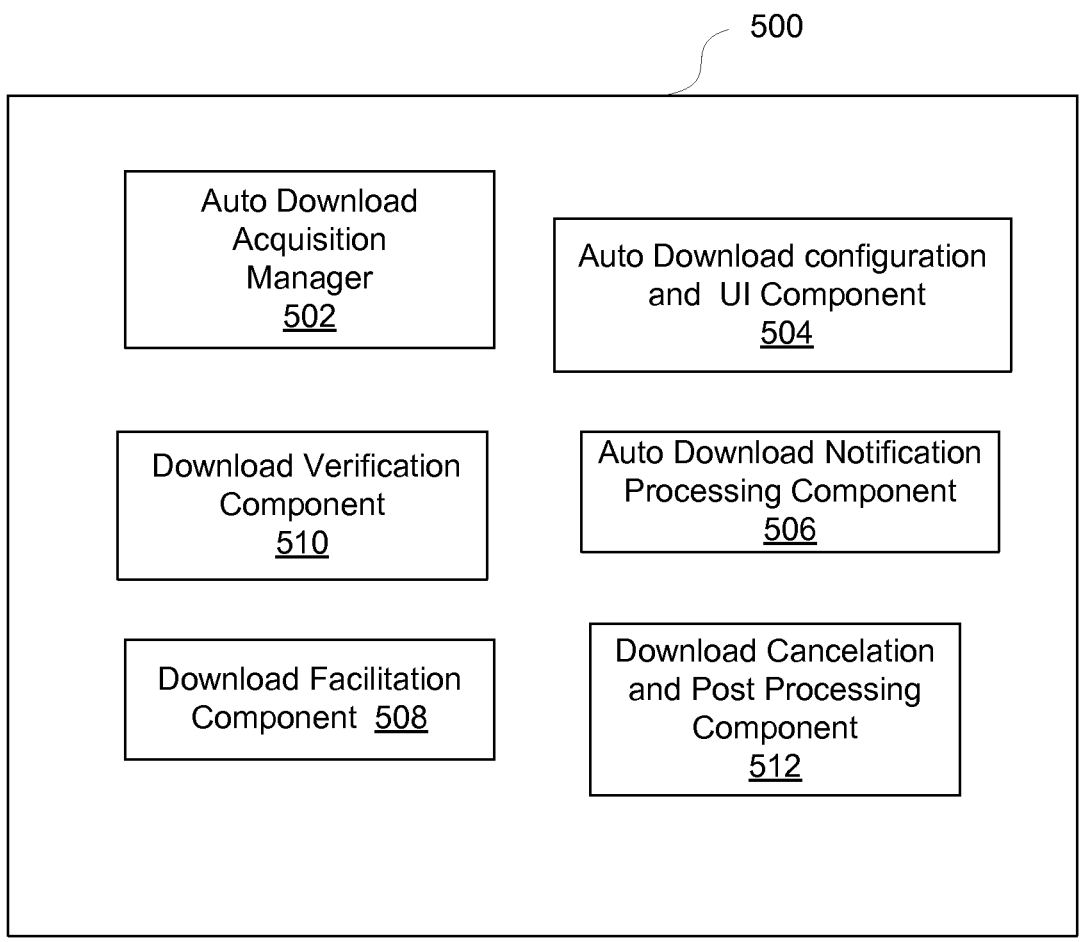
FIG. 5 depicts an automatic download delivery component in accordance with one embodiment.

To further elaborate, FIG. 5 depicts an automatic acquisition component 500 in accordance with one embodiment. One or more components of the automatic acquisition component 500 can, for example, be provided by the intelligent acquisition component 122 depicted in FIG. 1 to facilitate automatic download of digital assets. As such, the automatic acquisition component 500 can, for example, be provided by or for an electronic device.

Referring to FIG. 5, a download acquisition manager 502 can effectively manage a number of other components of the automatic acquisition component 500 and coordinate automatic download related operations, activities and/or events. Generally, an indication or notification related to automatic download of a digital asset can be obtained by one or more components of the automatic acquisition component 500. Typically, the indication or notification is sent directly or indirectly by an automatic delivery component (e.g., an automatic delivery download component 400 depicted in FIG. 4). An indication can, for example, pertain to a notification regarding availability of an automatic download option, or it may pertain to a particular UI relating to automatic download of digital assets to be displayed for a user. Generally, an automatic download configuration and UI component 504 can perform activities related to setting download configuration and interfacing with a user. As such, the automatic download configuration and UI component 504 can, for example, be operable to cause display of a particular dialog or user configuration window relating to automatic download of digital assets. The automatic download configuration and UI component 504 can be operable to determine the UI components to be displayed. However, it may be desirable to allow a server component associated with an online store (e.g., automatic download configuration manager 402) to control at least some aspects of user interfaces, including when to display a UI and options to be presented to users. This may allow changes to be made more efficiently and easily via a central entity rather than changing numerous electronic devices. In any case, a download notification can be received and processed, at least initially, by an automatic download notification component 506. Consequently, an indication for availability of a digital asset for download can result in automatic download of the digital asset by the automatic acquisition component 500. More particularly, a download facilitation component 508 can facilitate automatic downloading of a digital asset, for example, based on a Universal Resource Locator (URL) received from a server associated with an online store. Generally, a URL can specify where an identified resource is available and the mechanism for retrieving it. As such, a URL is one exemplary mechanism that can be used to facilitate automatic downloading and/or effectively canceling the automatic downloading of digital assets.

It should be noted that a download verification component 510 can determine whether or not to download an available asset, prior to allowing the download facilitation component 512 to facilitate the asset being downloaded. Generally, the download verification component 510 can determine whether the download is appropriate or desired for a particular user or device. As such, a download verification component 510 can, for example, determine: whether a device is currently registered to the user of the acquisition device that effectively caused the digital asset to be made available for automatic download, whether the digital asset available for downloaded is already stored on a device, whether the digital asset is supported by the device, or whether auto download configuration of the electronic device, which may be indicative of a preference of user, would allow the download, and so on. As such, it should be noted that download acquisition manager 502 can also facilitate storage of download configuration data locally on an electronic device, or obtain automatic download configuration from a server and/or trusted component. In any case, automatic download configuration data may be used by the download verification component 510 to determine whether or not to download a digital asset. In addition, a download cancelation and post processing component 512 can effectively cancel automatic downloads and perform post download operations, including: (i) removing an asset that has been automatically downloaded, and (ii) installing an asset (e.g., an application) that has been automatically downloaded. Cancelation of an automatic download scheduled to be performed or in the process of being performed can, for example, be performed based on user input provided via a UI. A cancelation and/or removal of a digital asset automatically downloaded or to be automatically downloaded can be performed. For example, based on a URL provided by a server, the URL can be used to inform the server that the delivery of the digital asset has been canceled. Those skilled in the art will also appreciate that an automatic download token may also be used to facilitate downloading of digital assets. An automatic download token can, for example, be passed back and forth between the download acquisition manager 502 and a server during notification of available download or requesting download.

Figure 6:
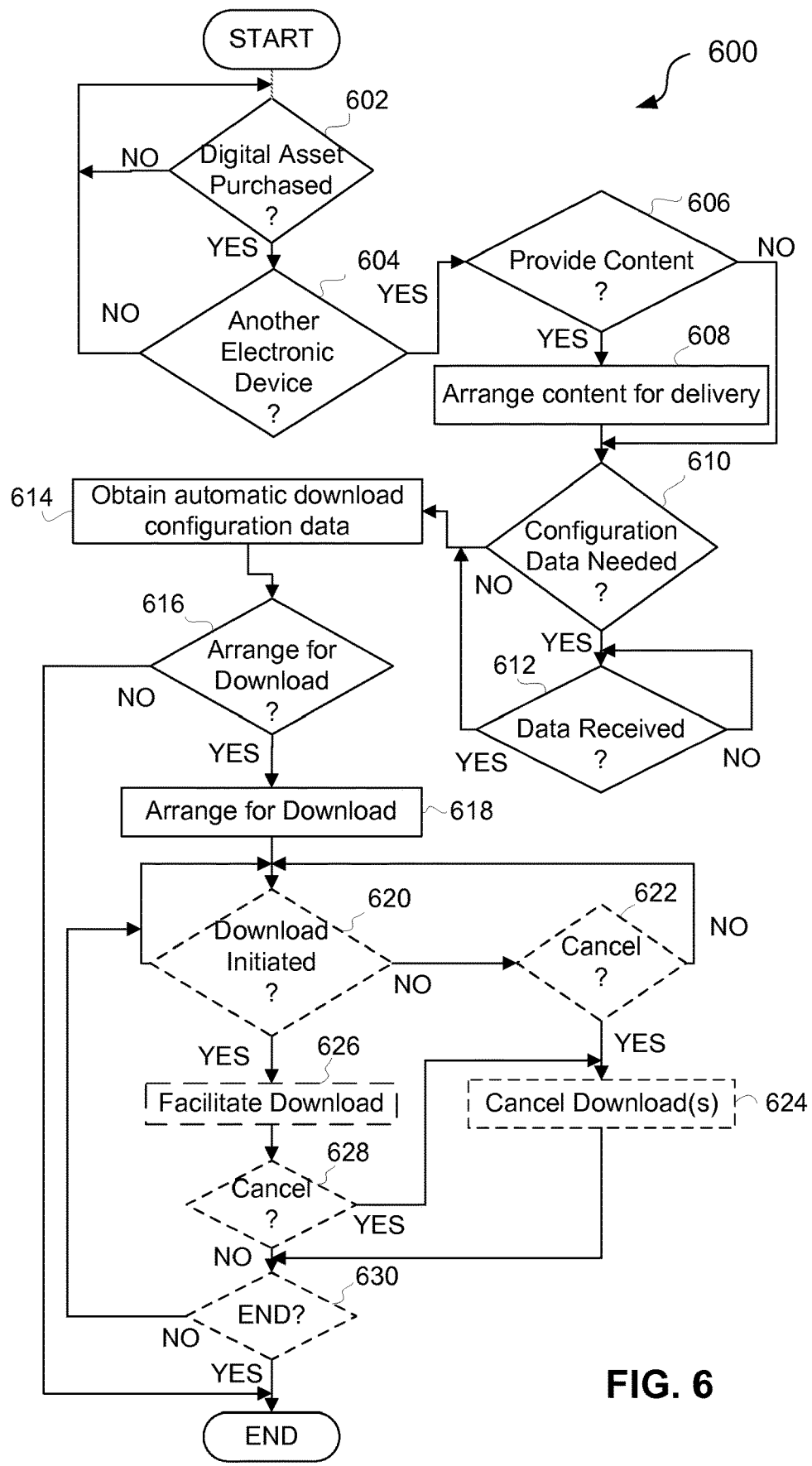
FIG. 6 depicts a method for facilitating automatic downloading of a digital asset in accordance with another exemplary embodiment.

FIG. 6 depicts a method 600 for facilitating automatic downloading of a digital asset in accordance with another exemplary embodiment. Method 600 can, for example, be used by the automatic download delivery component 400 depicted in FIG. 4. As such, method 600 can, for example, be performed by a server or one or more server components.

Referring to FIG. 6, initially, it is determined (602) whether a digital asset has been purchased from an online store via an acquisition device registered to a user. If it is determined (602) that a digital asset has been purchased from an online store via an acquisition device registered to a user, it is determined (604) whether there is at least one other electronic device also registered to the same user. The other requested device can be referred to as a requested device. If it is determined (604) that no other electronic device has been registered to the user, method 600 can effectively wait for a determination (602) that a digital asset has been purchased from an online store via an acquisition device registered to a user. However, if it is determined (604) that at least one electronic device other than the acquisition device has been registered to the same user, it can be determined (606) whether to provide a digital asset (e.g., digital content) to the acquisition device and/or at least one other electronic device registered to the user. As a result, content including indications, configurations and/or various user interfaces can be effectively delivered (608) to the acquisition device and/or at least one other electronic device registered to the user. In one embodiment, it may be desirable to provide to solicit user interest (e.g., via the acquisition device) in facilitating automatic download. In addition, if the user is interested in an automatic download feature, an automatic download token can be provided to the acquisition device and/or one or more other electronic devices registered to the user.

Subsequently, it can be determined (610) whether automatic download configuration data is needed. Automatic download configuration data can, for example, represent preferences of a user with respect to automatically downloading. The download configuration data can pertain to particular types of digital assets for various devices that have been registered to the user. Although not shown in FIG. 6, it should be noted that authentication of the user can also be performed during the configuration process. In any case, if it is determined (610) that configuration data is needed, the method 600 can effectively wait (612) for data to be received.

Thereafter, or in the case when it is determined (610) that configuration data is available and therefore not needed to be received, download configuration data can be obtained (614) to determine (616) whether to arrange the digital asset acquired by the acquisition device for delivery to one or more electronic devices other than the acquisition device that has been registered to the user. If it is determined (616) based on the download configuration data whether the digital asset is to be delivered to at least one electronic device other than the acquisition device, the digital asset is arranged (618) for automatic download to at least one electronic device other than the acquisition device. Arranging (618) the digital asset for delivery can, for example, include determining an appropriate type, version and/or format to be delivered to a particular electronic device, sending a push notification to an electronic device, storing the appropriate digital asset in a delivery queue for delivery at an appropriate time (e.g., when one or more network conditions are met), and/or recording automatic download data for a particular user and/or device. Optionally, additional operations can be performed after the digital asset has been arranged for delivery (618).

After the digital asset has been arranged for delivery (618), method 600 can determine (620) whether download is to be initiated or whether the automatic download is to be cancelled (622) before the download is initiated. Accordingly, an automatic download can be canceled (624) before it is initiated. When it is determined (620) that an automatic download is to be initiated, automatic download of the digital asset can be facilitated (626). An automatic download can, for example, be initiated when an electronic device initiates it and/or one or more delivery conditions are met (e.g., network type or bandwidth is appropriate for download). It should be noted that it can be determined (628) to cancel a download after it has been facilitated (626). In addition, it can be determined (630) whether to end method 600. Method 600 can, for example, end after the arranged automatic downloads have been completed or canceled, or after a determined amount of time has lapsed.

Figure 7:
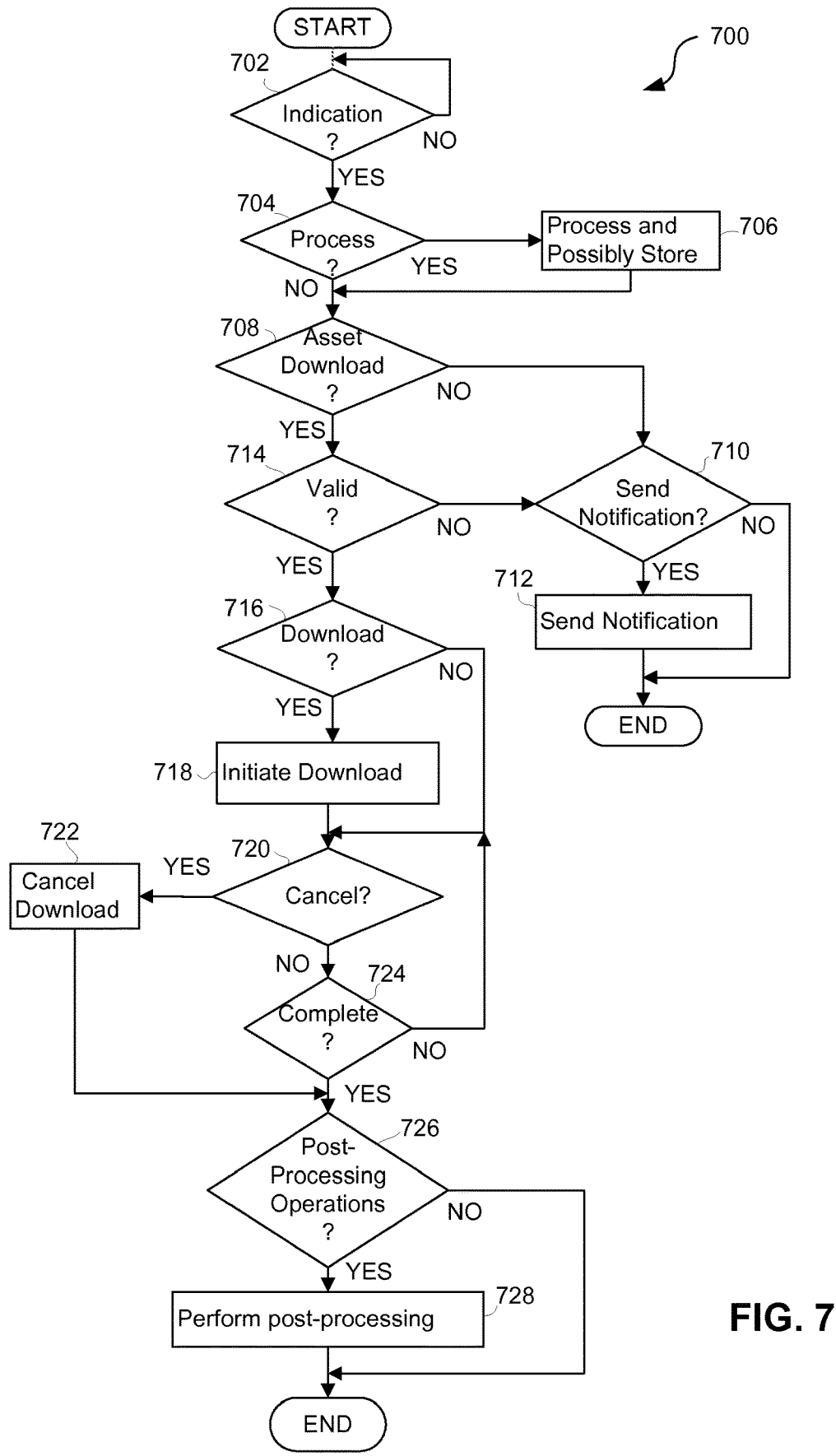
FIG. 7 depicts a method for facilitating automatic downloading of a digital asset in accordance with yet another exemplary embodiment.

FIG. 7 depicts a method 700 for facilitating automatic downloading of a digital asset in accordance with yet another exemplary embodiment. Method 700 can, for example, be used by the automatic acquisition component 500 depicted in FIG. 5. As such, method 600 can, for example, be performed by an electronic device in order to facilitate automatic download of a digital asset available for purchase from an online server.

Referring to FIG. 7, initially, it is determined (702) whether an indication (e.g., content pushed by a server) relating to an automatic download feature has been received. In effect, method 700 can wait to receive an indication. The indication can, for example, pertain to a configuration option, UI, or availability of one or more digital assets for download. As such, if it is determined (702) that an indication has been received, it can be determined (704) whether to process the indication and/or data associated with the indication. By way of example, a UI or configuration menu can be displayed and/or possibly stored. Generally, if it is determined (704) to process data associated with the indication, data can be processed and possibly stored (706).

Thereafter, it can be determined (708) whether the indication is associated with availability of a digital asset for download. If it is determined (708) that the indication is not associated with availability of digital asset for download, it can be determined (710) whether to send a notification or acknowledgement regarding the indication received or possibly other data related to automatic downloading of digital assets. Accordingly, data can be sent (712) before the method 700 ends. However, if it is determined (708) that the indication is associated with the availability of a digital asset for download, validity of the indication can be verified (714). By way of example, it can be determined (714) whether the digital asset available for automatic download is supported by the electronic device. If it is determined (714) that the validity of the digital asset to be downloaded is not successfully verified, it can be determined (710) whether to send a notification or other data regarding the indication. Accordingly, a notification regarding the invalidity of the automatic download, a cancelation request and/or other data can be sent (712) before the method 700 ends.

On the other hand, if the validity of the download is successfully verified (714), it can be determined (716) whether to initiate downloading the digital asset. Accordingly, downloading of the digital asset can be initiated (718). However, if it is determined (720) to cancel the download, download can be canceled (722) after it has been initiated (718). After the download has been canceled (722), or once it is determined (724) that the download has been completed, it can be determined (726) to perform post processing (or post download processing). Accordingly, one or more post processing operations can be performed (728). For example, the digital asset that has been downloaded can be installed, added to a library, or removed. Method 700 can end after post processing (728) has been performed or without performing post processing if it is determined (726) not to perform post processing.

Figure 8:
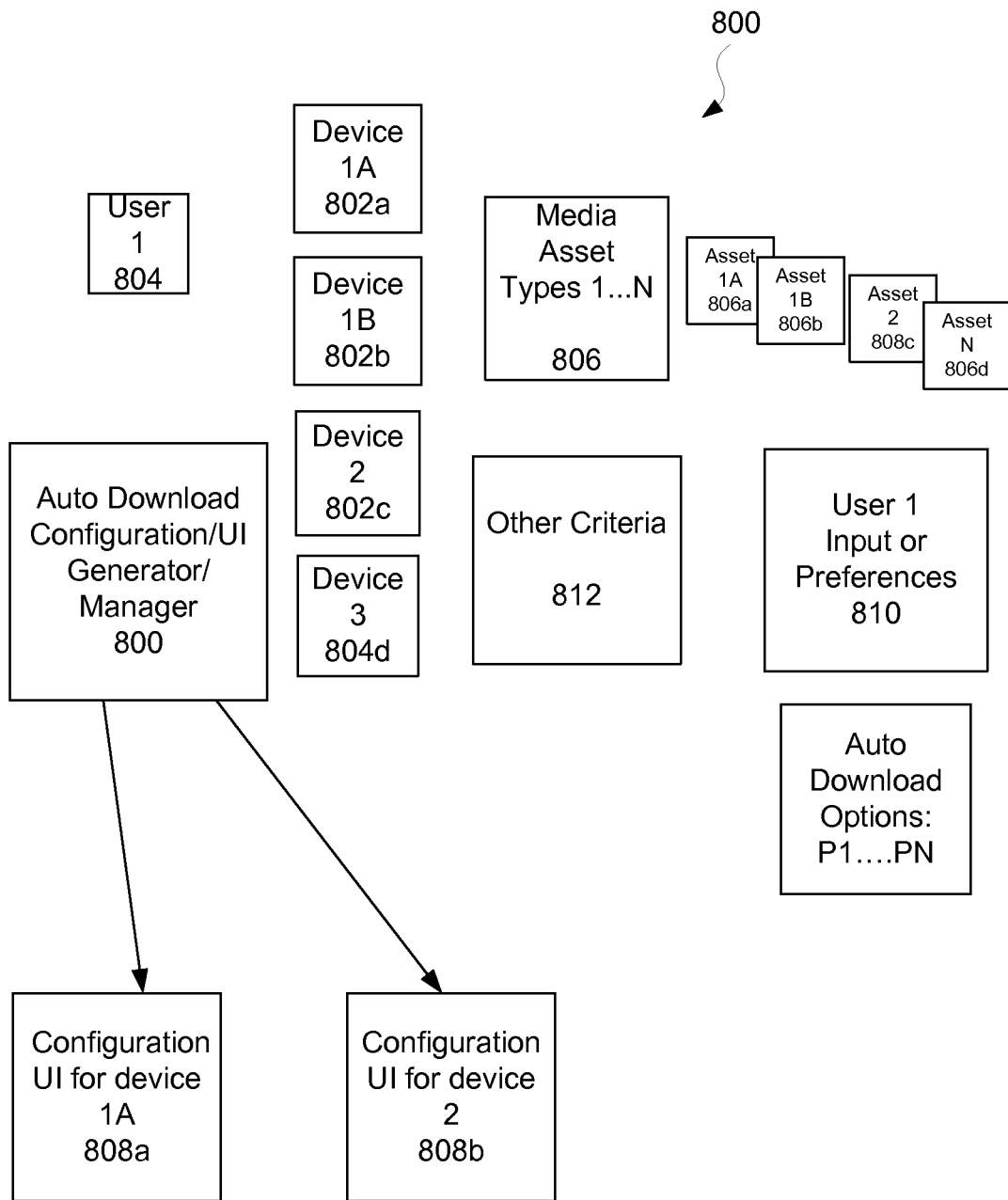
FIG. 8 depicts an automatic download configuration generator in accordance with one embodiment.

As noted above, automatic download configuration data (e.g., menus, dialogs, windows) can be created and provide in a customized manner. To further elaborate, FIG. 8 depicts an automatic download configuration generator 800 in accordance with one embodiment. Automatic download configuration generator 800 can be provided at least in part by a server associated with an online store and/or by an electronic device operable to acquire digital assets from server devices. Referring to FIG. 8, various electronic devices 802 can be associated with a user 804. Devices 802a and 802b may, for example, be of the same type (e.g., two smartphones, two devices capable of media playback) as opposed to devices 804c and 804d which can be of different types or have different capabilities (e.g., a laptop computer, and a portable media player without a display). In any case, various types of digital assets 806 can be available for purchase from an online store accessible to the devices 802. Further, a digital asset (e.g., video, image, application program, etc.) may have a particular format or version supported by a particular device. By way of example, media asset 806a may be currently supported by device 802a but not currently supported by the device 802b. In any case, the automatic download configuration generator 800 can take digital asset types and device types into consideration and generate automatic configuration user interfaces 808 (e.g., 808a and 808b) that are more appropriate for each one of the devices 802. It should be noted that user input and/or preferences 810 as well as other criteria 812 (e.g., network type, connectivity and/or bandwidth) can also be considered by the automatic download configuration generator 800 in generating an automatic download configuration UI. Generally, a relatively large number of possible automatic download parameters or options can be made available. However, the automatic download configuration generator 800 can effectively eliminate a number of possible automatic download parameters or options that may not be applicable or desired for a particular device to, for example, create a more suitable automatic download configuration user interface 808a (e.g., configuration window) for a device 802a, or a more suitable download configuration user interface 808b (e.g., configuration window) for device 2.

Figure 9:
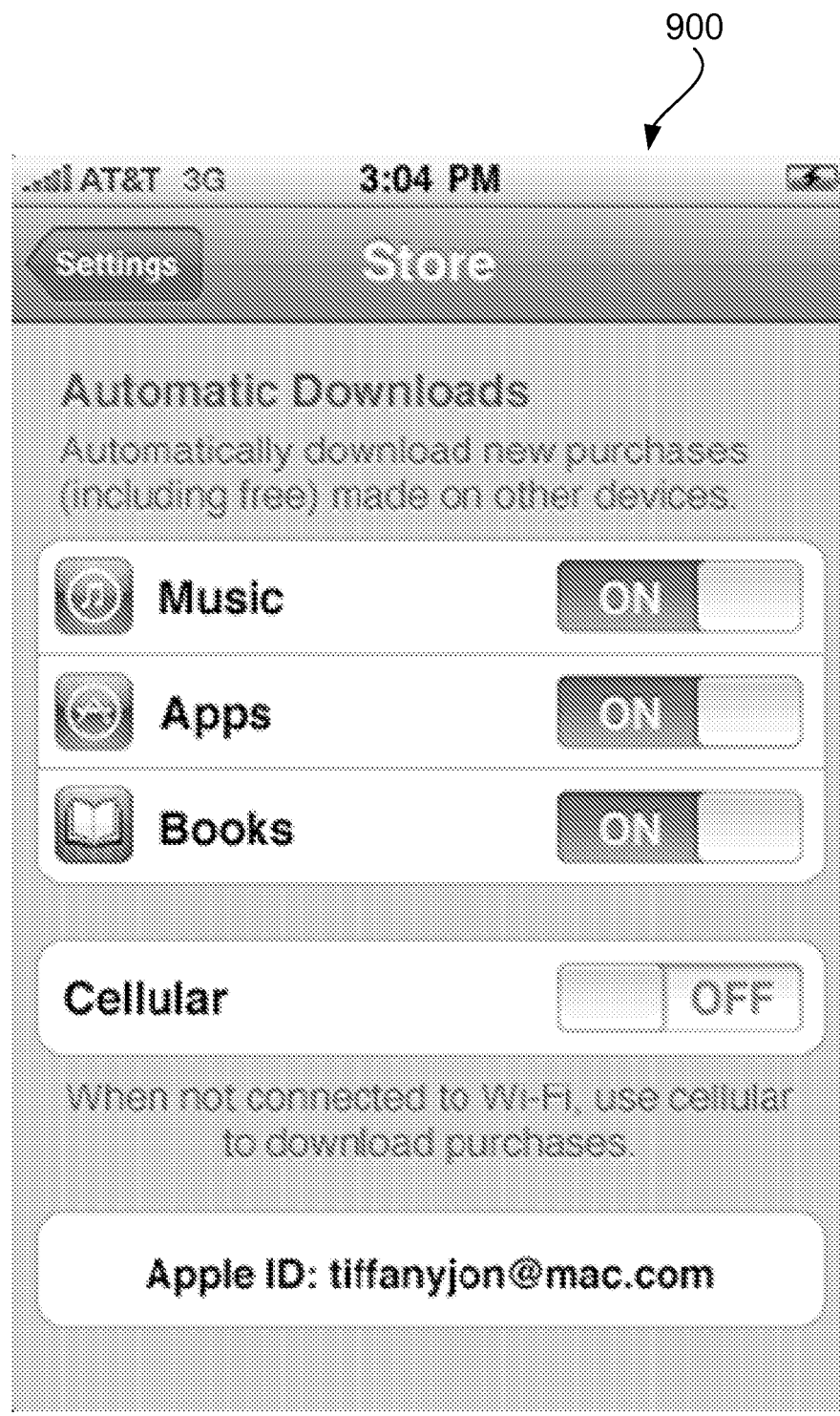
FIG. 9 depicts and exemplary automatic configuration UI in form of a window suitable for display on various electronic devices.

To elaborate even further, FIG. 9 depicts an exemplary automatic configuration UI in form of a window 900 suitable for display on various electronic devices. Referring to FIG. 9, automatic download options (or switches) for assets purchased for a fee (or acquired for free) are provided in the window 900. It should be noted that automatic download options of window 900 can be provided based on asset types that may be applicable to a particular electronic device. As such, "Music," "Apps," and "Books" can be presented as selectable options in window 900 to the user. However, it should be noted that if an electronic device, for example, does not have the ability to use "Apps" or "Books," then only a "Music" option may be displayed for that electronic device. Alternatively, more media types (e.g., movies) may be disabled as selectable options if applicable. Referring to FIG. 9, a network automatic download option can also be provided as a selectable option ("Cellular") to effectively allow the user to select whether the automatic downloads should take place via a cellular network (which may have a data transfer fee). If the selectable option is set to "off", then automatic download will only occur when the electronic device is connected to a Wi-FI connection. It should also be noted that a selected automatic download option can be provided to an online store server. In doing, the user may be required to sign in to a user account via a particular device to effectively register or submit the selected automatic downloads options pertaining to the electronic device. Hence, an online store server may be able to keep track of various registered electronic devices and their respective automatic downloads options.

Generally, when a digital asset, and in particular a media asset is acquired by purchase (for a fee or for free) from an online store using a first electronic device associated with the user, an online store server can effectively put the digital asset in the queue for delivery for all the electronic devices registered to the user with the appropriate settings for the automatic download selected. However, the number of electronic devices a user can register for automatic download may be limited or additional cost may be imposed beyond a determined number of registered devices. In any case, the online store server can send a push notification to each device selected to receive the automatic download. A push notification can instruct a recipient electronic device to transparently check its delivery queue without requiring explicit user input, feedback or instructions. As such, one or more electronic devices registered to the user (possibly all devices registered to the user) can check their respective delivery (purchase or acquisition) queues and download the one or more digital assets via a background process, and in particular, from the perspective of person using the electronic device. Various rules can be defined and effectively applied to an automatic download option or feature. For example, automatic downloads can be made to have lower priority than downloads that are explicitly requested by a user, duplication of digital assets can be avoided, arranged downloaded can be canceled or automatically downloaded digital assets can be removed, etc.

As noted above, automatic download configuration can be presented as one or more selectable options or switches that can be enabled or disabled. The selectable options and switches for allowing automatic download may initially (or as a default option) be turned off so as not to allow automatic download. Further, a system can be configured so that signing out of an account causes an automatic download option to be turned off, or an option may automatically get turned off after a determined period of time, requiring a user to log back in order to turn on the automatic download option again.

Furthermore, current system capability, including disk space as well as size of the digital asset can be considered in determining whether to automatically download an asset so that, for example, a digital asset over a predetermined size (e.g., 10 Megabytes (MB), 3 Gigabytes (GB)) may not be automatically downloaded, and/or a digital asset may be downloaded only if there is a predetermined amount of free space (e.g., 100 GB) is available on the electronic device. In addition, various restrictions, including parental controls, blocked items or sources, can be considered in determining whether to automatically download a digital asset to a particular device. Still further, a system can be configured such that disabling an enabled automatic download option may result in immediate removal of digital assets queued for automatic download. Other features may be configured including, resumption of interrupted automatic downloads as a result of an electronic device getting disconnect or getting engaged in higher priority activities during the download. An electronic device that has been off for a relatively long time (e.g., six months) can be allowed to automatically download digital assets that have been queued for the electronic device. However, a time limit for making an asset available for automatic download can also be effectively imposed (e.g., six months for all assets, one month for relatively large assets). In addition, a new or revised version of an asset can be effectively automatically downloaded if available at the time the download takes place. In other words, an older version of an asset may be replaced in a delivery queue for automatic download so that a new or revised version can be downloaded. An informative or discovery dialog can be presented as soon as an electronic device is purchased to inform the user of availability of an automatic download feature. As another optional feature, explicit purchase of an asset to be automatically downloaded would not result in downloading the asset twice.

Generally, it may be more desirable to configure an online store server to have control or more control over some aspects of automatic download than the user. For example, an online store server can determine never to allow automatic download of an asset that is not supported by a particular device. As an example, an iPhone™ device may be effectively prevented from receiving an iPad™ application. As another example, online store server can determine when various user interfaces including dialogs and configuration windows are to be displayed. In addition, the online store server can determine the substance and form of the configuration options so that future changes can be implemented without having to alter numerous electronic devices that interact with the online store server.

Furthermore, it should be noted that changes to a device or its configuration can result in changes in automatic downloaded configuration options and behavior. By way of example, if a particular type (or form) of digital assets (e.g., books) is no longer viable for (or supported by) an electronic device because of a change to the device (e.g., book reading/presenting application has been uninstalled) the digital asset type (e.g., Books) would no longer be automatically downloaded to the device and the configuration window for the device would not show the digital asset type as an option for download as long as the digital asset type is not viable for (or supported by) the device. Alternatively, a user interface can be used to suggest or facilitate download of a book reading application.

In view of the foregoing, it will readily be known that an electronic device provided in accordance with one or more embodiments can, for example, be a computing device (e.g., personal computer), mobile phone (e.g., cellular phone), personal digital assistant (PDA), media player (e.g., music, videos, games, images), media storage device, camera, and/or the like. An electronic device may also be a multi-functional device that combines two or more of these device functionalities into a single device. A portable electronic device may support various types of network communications.

A portable electronic device can be provided as a hand-held electronic device. The term hand-held can generally refer to an electronic device with a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

Digital media assets (e.g., digital media items) can, for example pertain to video items (e.g., video files or movies), audio items (e.g., audio files or audio tracks, such as for songs, musical albums, podcasts or audiobooks), or image items (e.g., photos). The digital media assets can also include or be supplemented by text or multimedia files.

Additional information on digital asset delivery is provided in U.S. patent application Ser. No. 11/849,711, filed Sep. 4, 2007, and entitled "Digital Asset Delivery to Different Devices," which is hereby incorporated herein by reference. The corresponding US Patent Publication 2009/0063301 A1 is also hereby incorporated herein by reference.

The various aspects, features, embodiments or implementations of the invention described above can be used alone or in various combinations.

The invention is preferably implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of various embodiments of the invention are numerous. Different aspects, embodiments or implementations may, but need not, yield one or more of the following advantages. One advantage of at least some embodiments is that a digital asset (e.g., media item) acquired by one device can be automatically delivered to other electronic devices without requiring user participation beyond initial setup. Another advantage at least some embodiments is that digital assets can be automatically delivered to appropriate electronic devices. Still another advantage at least some embodiments is that user preferences can be easily set and accommodated. Yet another advantage at least some embodiments is that customized user interfaces can be provided in consideration of various criteria, including device capabilities, user profiles and/or user preferences.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention claimed is:

1. A non-transitory computer-readable medium comprising computer-readable instructions that, when executed by one or more processors, cause the one or more processors to:
   identify a digital asset provided to a first electronic device associated with a user account;
   identify configuration data of a second electronic device indicating to automatically download digital assets acquired by other devices associated with the user account, wherein the second electronic device is associated with the user account; and
   in response to identifying the configuration data of the second electronic device:
   identify a version of the digital asset to provide to the second electronic device associated with the user account; and
   arrange automatic delivery of the version of the digital asset to the second electronic device.

2. The non-transitory computer-readable medium of claim 1, wherein, when executed by the one or more processors, the instructions cause the one or more processors to:

arrange delivery of a second version of the digital asset to the first electronic device; and after arranging delivery of the second version of the digital asset, identify the version of the digital asset to provide to the second electronic device.

3. The non-transitory computer-readable medium of claim 1, wherein, when executed by the one or more processors, the instructions cause the one or more processors to:

identify, based on the configuration data, a media type that should be automatically downloaded to the second electronic device; and arrange the automatic delivery of the version of the digital asset to the second electronic device when the digital asset corresponds to the media type that should be automatically downloaded to the second electronic device.

4. The non-transitory computer-readable medium of claim 3, wherein, when executed by the one or more processors, the instructions cause the one or more processors to refrain from arranging automatic delivery of the version of the digital asset to the second electronic device when the digital asset does not correspond to the media type that should not be automatically downloaded to the second electronic device.

5. The non-transitory computer-readable medium of claim 1, wherein the digital asset is available to be acquired from an online store.

6. The non-transitory computer-readable medium of claim 1, wherein the digital asset comprises an application.

7. The non-transitory computer-readable medium of claim 1, wherein the digital asset comprises a video, a song, an album, a podcast, an audiobook, a game, an image, or a combination thereof.

8. The non-transitory computer-readable medium of claim 1, wherein, when executed by the one or more processors, the instructions cause the one or more processors to:

identify, based on the configuration data, a media type that should be automatically downloaded to the second electronic device; and refrain from arranging automatic delivery of the version of the digital asset to the second electronic device when the digital asset corresponds to a media type other than the media type that should be automatically downloaded to the second electronic device.

9. The non-transitory computer-readable medium of claim 1, wherein the non-transitory computer-readable medium is included in a server.

10. A method, comprising:

identifying, by one or more processors, a digital asset provided to a first electronic device associated with a user account;

identifying configuration data of a second electronic device indicating to automatically download digital assets acquired by other devices associated with the user account, wherein the second electronic device is associated with the user account; and in response to identifying the configuration data of the second electronic device:

identifying, by the one or more processors, a version of the digital asset to provide to the second electronic device associated with the user account; and arranging, by the one or more processors, automatic delivery of the version of the digital asset to the second electronic device.

11. The method of claim 10, comprising:

arranging, by the one or more processors, delivery of a second version of the digital asset to the first electronic device;

after arranging delivery of the second version of the digital asset, identifying, by the one or more processors, the version of the digital asset to provide to the second electronic device;

identifying, by the one or more processors and based on the configuration data, a media type that should be automatically downloaded to the second electronic device; and arranging, by the one or more processors, the automatic delivery of the version of the digital asset to the second electronic device when the digital asset corresponds to the media type that should be automatically downloaded to the second electronic device.

12. The method of claim 11, comprising refraining, by the one or more processors, from arranging automatic delivery of the version of the digital asset to the second electronic device when the digital asset corresponds to a media type that should not be automatically downloaded to the second electronic device.

13. The method of claim 12, comprising determining, by the one or more processors, whether the digital asset corresponds to the media type that should be automatically downloaded to the second electronic device or corresponds to the media type that should not be automatically downloaded to the second electronic device.

14. The method of claim 13, wherein the media type that should be automatically downloaded comprises an application, music, an audiobook, or a combination thereof.

15. A non-transitory computer-readable medium comprising computer-readable instructions that, when executed by a one or more processors, cause the one or more processors to:

identify an application available on an online store and that has been provided to a first electronic device associated with a user account;

identify configuration data of a second electronic device indicating to automatically download digital assets acquired by other devices associated with the user account, wherein the second electronic device is associated with the user account; and in response to identifying the configuration data of the second electronic device:

identify a version of the application to provide to the second electronic device associated with the user account; and arrange automatic delivery of the version of the application to the second electronic device.

16. The non-transitory computer-readable medium of claim 15, wherein, when executed by the one or more processors, the instructions cause the one or more processors to:

arrange delivery of a second version of the application to a first electronic device; and after arranging delivery of the second version of the application, identify the version of the application to provide to the second electronic device.

17. The non-transitory computer-readable medium of claim 16, wherein the version of the application and the second version of the application are a same version of the application.

18. The non-transitory computer-readable medium of claim 15, wherein the user account comprises an account of the online store.

19. The non-transitory computer-readable medium of claim 15, wherein, when executed by the one or more processors, the instructions cause the one or more processors to:
- identify whether the version of the application corresponds to a content type that should not be automatically downloaded to the second electronic device via a cellular connection; and
- prevent automatic delivery of the version of the application to the second electronic device over the cellular connection when the version of the application corresponds to the content type that should not be automatically downloaded to the second electronic device via the cellular connection.

20. The non-transitory computer-readable medium of claim 19, wherein, when executed by the one or more processors, the instructions cause the one or more processors to allow the second electronic device to download the version of the application over a Wi-Fi connection when the version of the application corresponds to the content type that should not be automatically downloaded to the second electronic device via the cellular connection.

* * * * *